Patented Feb. 24, 1942

2,274,474

UNITED STATES PATENT OFFICE 2,274,474

ALKOXY ALKYLOL CYANAMIDE COMPOUND

Walter P. Ericks, Cos Cob, Conn., assignor to American Cyanamid Company, New York, N. Y., a corporation of Maine No Drawing. Application August 10, 1939, Serial No. 289,400

4 Claims. (Cl. 260—551)

This invention relates to new alkoxyalkylol cyanamide compounds.

I have found that when two or more moles of a compound containing an ethylene oxide ring and one mole of an alkaline earth metal cyanamide are reacted together in an aqueous solution, there are obtained ether alcohol derivatives of cyanamide.

As a consequence of tautomerism the above type of compounds may occur in several isomeric forms. Possibly two, three, or even four of these isomers may co-exist in a state of equilibrium. According to physical or chemical influence one of these isomers will predominate and I therefore designate the reaction product as a monomeric compound with an open chain structure of the following representative formula:

$$N \equiv C - \overset{H}{\underset{|}{N}} - (R)_x - R'OH$$

wherein R is a member of the group consisting of ethoxy, alkyl substituted ethoxy and hydroxyalkyl substituted ethoxy radicals, $x$ is a whole number, and R' is a member of the group consisting of ethylene, alkyl substituted ethylene, and hydroxyalkyl substituted ethylene radicals.

The alkoxyalkylol cyanamides may be prepared as follows:

An aqueous slurry of an alkaline earth metal cyanamide is prepared by introducing one mole equivalent of the cyanamide compound in small portions into water which is stirred rapidly. Two or more mole equivalents of a compound containing an ethylene oxide ring are then introduced slowly at atmospheric pressure into the agitated suspension which is maintained at a temperature not exceeding the boiling point of said compound. If desired the reaction may be carried out at elevated pressures in order that it may be completed in less time. The mixture is filtered. The filter cake containing the major portion of the alkaline earth metal as an insoluble is washed with water. A precipitant such as carbon dioxide is passed into the combined filtrate and washings to throw out the residual alkaline earth metal as a substantially insoluble compound which is filtered off. The alkoxyalkylol cyanamide is obtained from the filtrate after removing the water by evaporation.

It is preferable to carry out the evaporation under reduced pressure of 10–20 mm. mercury as in such case less time and lower evaporating temperatures are required.

The cyanamide material used in the following examples is crude calcium cyanamide known to the trade as Cyanamid.

The materials employed in the examples are in parts by weight.

EXAMPLE 1

Ethoxy-ethylol cyanamide

This compound was prepared by the reaction of two moles of ethylene oxide with one mole of calcium cyanamide in an aqueous slurry.

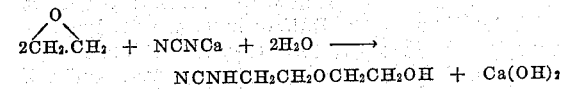

134 parts of Cyanamid (60.6% NCNCa) were introduced in small portions into 500 parts of water which were stirred rapidly at a temperature not exceeding 25° C. The slurry was agitated for one hour and then cooled to about 5° C. 88 parts of ethylene oxide were introduced into the agitated slurry at such a rate that the reaction temperature was maintained below 10° C. The mixture was stirred for one hour and the temperature allowed to rise slowly to 25° C. After standing for several hours the mixture was filtered and the filter cake washed with water. Carbon dioxide was passed into the combined filtrate and washings to precipitate the residual calcium as carbonate which was filtered off. The filtrate was transferred to an evaporator and the water evaporated under reduced pressure of 10–20 mm. mercury. The product was a colorless viscous liquid.

EXAMPLE 2

Triethoxy-ethylol cyanamide

This compound was prepared by the reaction of four moles of ethylene oxide with one mole of calcium cyanamide in an aqueous slurry.

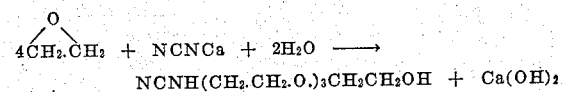

134 parts of Cyanamid (60.6% NCNCa), 250 parts of water and 176 parts of ethylene oxide were placed in a pressure autoclave provided with heating and agitating means. The reaction cycle was as follows:

| Time (min.) | Temperature, °C. | Pressure, lbs./sq. in. |
| --- | --- | --- |
| 5 | 30 | No pressure indicated. |
| 10 | 40 | Do. |
| 15 | 50 | 30. |
| 20 | 64 | 40. |
| 25 | 73 | 50. |
| 30 | 84 | 60. |
| 35 | 92 | 70. |
| 40 | 103 | 50. |
| 45 | 108 | 40. |
| 50 | 105 | 30. |
| 55 | 105 | 25–30. |
| 60 | 105 | 20–25. |
| 65 | 105 | 20–22. |
| 70 | 103 | 20 or less. |

The autoclave was slowly cooled to room temperature. The reacted mixture was filtered. The filter cake was washed with small portions of water. Carbon dioxide was passed into the combined filtrate and washings to precipitate the residual calcium as calcium carbonate which was filtered off. The filtrate was evaporated in an open pan until the water was removed. The product was a pale yellow oil-like liquid.

EXAMPLE 3

*Nonaethoxy-ethylol cyanamide*

This compound was prepared by the reaction of ten moles of ethylene oxide with one mole of calcium cyanamide in an aqueous slurry.

$$10 \overset{O}{\overset{}{\underset{}{CH_2.CH_2}}} + NCNCa + 2H_2O \longrightarrow$$
$$NCNH(CH_2.CH_2.O.)_9CH_2CH_2OH + Ca(OH)_2$$

134 parts of Cyanamid (60.6% NCNCa), 250 parts of water and 440 parts of ethylene oxide were placed in a pressure autoclave provided with heating and agitating means. During the reaction cycle a gradual rise in pressure took place until a temperature of 92° C. was reached. At this point a rapid rise in temperature occurred to a maximum of about 180° C. The charge was then slowly cooled to room temperature, filtered and the filter cake washed with water. The combined filtrate and washings were treated with carbon dioxide to precipitate the remaining calcium as calcium carbonate which was filtered off. The filtrate was transferred to an evaporator and the water evaporated under reduced pressure of 10–20 mm. mercury. The product was an amber colored oil-like liquid equal to approximately 98% of the theoretical yield.

EXAMPLE 4

*Tripropoxy-propylol cyanamide*

This compound was prepared by the reaction of four moles of propylene oxide with one mole of calcium cyanamide in an aqueous slurry.

$$4 \overset{O}{\overset{}{\underset{}{CH_3.CH.CH_2}}} + NCNCa + 2H_2O \longrightarrow$$

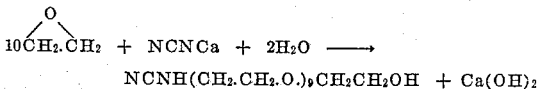

134 parts of Cyanamid (60.6% NCNCa), 250 parts of water and 232 parts of propylene oxide were placed in a pressure autoclave provided with heating and agitating means. The charge was heated to a temperature of about 110° C. within a period of 80 minutes. After cooling to room temperature the reacted slurry was removed from the autoclave, filtered and the filter cake washed with small portions of water. Carbon dioxide was passed into the combined filtrate and washings to precipitate the residual calcium as carbonate. The mixture was filtered and the filtrate evaporated under reduced pressure of 10–20 mm. mercury until the water was removed. The product was a pale yellow oil-like liquid equal to 89.5% of the theoretical yield.

EXAMPLE 5

*Butoxy-butylol cyanamide*

This compound was prepared by reacting one mole of calcium cyanamide in an aqueous slurry with isobutylene oxide used in a quantity larger than that required by theory.

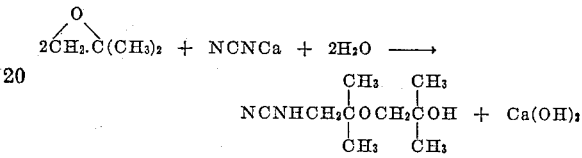

A slurry of 134 parts of Cyanamid (60.6% NCNCa), in 500 parts of water was prepared using the procedure described in Example 1. 288 parts of isobutylene oxide were introduced slowly into the agitated slurry keeping the temperature below 25° C. After the isobutylene oxide had been added the mixture was stirred for two hours and the temperature allowed to rise to 40° C. The reacted mixture was then cooled to room temperature, filtered and the filter cake washed with small portions of water. Carbon dioxide was passed into the combined filtrate and washings to precipitate the remaining calcium as carbonate.

The mixture was agitated with 4 parts of charcoal, filtered and the filtrate evaporated in an open vessel until the water and the unreacted isobutylene oxide were removed. The unreacted isobutylene oxide which was used in excess of that required by theory can be recovered by fractional distillation. The product was a colorless viscous liquid equal to approximately 95% of the theoretical yield.

EXAMPLE 6

*Pentahydroxypropoxy-dihydroxy propyl cyanamide*

This compound was prepared by the reaction of six moles of glycidol $$\overset{O}{\overset{}{\underset{}{(CH_2.CHCH_2OH)}}}$$

with one mole of calcium cyanamide in an aqueous slurry.

$$6 \overset{O}{\overset{}{\underset{}{CH_2.CHCH_2OH}}} + NCNCa + 2H_2O \longrightarrow$$

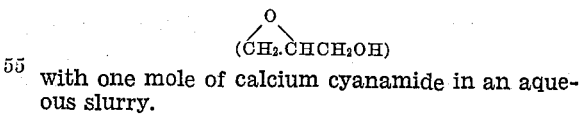

134 parts of Cyanamid (60.6% NCNCa), 400 parts of water and 444 parts of glycidol were placed in a pressure autoclave provided with heating and agitating means. The charge was heated to a temperature of about 120° C. within a period of one hour. After cooling to room temperature the reacted slurry was removed from the autoclave, filtered and the filter cake washed with water. Carbon dioxide was passed into the combined filtrate and washings to precipitate the remaining calcium as carbonate. The mixture was filtered and the filtrate evaporated under reduced pressure of 10–20 mm. mercury. The product was an amber colored oil-like liquid equal to 98% of the theoretical yield.

Similarly other members of the alkoxyalkylol cyanamide series may be obtained by using as a starting material the corresponding compound containing a reactive ethylene oxide ring and a proper substituent in the ethylene ring and reacting the same with an alkaline earth metal cyanamide.

These new compounds are of particular utility in the formulation of coating and molding compositions, as textile assistants, as plasticizers, as emulsifying agents for oils and fats, as dispersing agents, and as starting materials for the synthesis of artificial fibers, laminated materials, resins, adhesives, and other useful products.

Condensation products of the alkoxyalkylol cyanamides with organic monocarboxylic acids such as described in my copending application, Serial Number 278,456, filed June 10, 1939 are surface-active agents of the cation-active type; that is to say, their surface-active properties are due to the electropositive portion of the molecule. For this reason they are well suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for de-emulsification of oil emulsions, in the formulation of printing inks, dye pastes, dye baths, as softeners for leather, as flotation agents, in the application of rubber latex emulsions to wool, cotton and rayon textiles, in preparing emulsions of resins and the like.

In the claims, it will be understood that the term alkoxyalkylol cyanamide is intended to cover all isomeric forms in which the alkoxyalkylol cyanamide may exist, with the exception of diethylol cyanamide which is an isomer of the monosubstituted ethoxyethylol cyanamide. This isomer was previously known and hence is not to be included here as a new product.

While the invention has been described with particular reference to specific embodiments, it is to be understood that it is not to be limited thereto but is to be construed broadly and restricted solely by the scope of the appended claims.

I claim:

1. As a new compound, an alkyoxyalkylol cyanamide of the formula

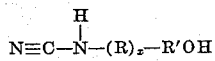

wherein R is a member of the group consisting of ethoxy, alkyl substituted ethoxy and hydroxyalkyl substituted ethoxy radicals, $x$ is a whole number, and R' is a member of the group consisting of ethylene, alkyl substituted ethylene, and hydroxyalkyl substituted ethylene radicals.

2. As a new compound nonaethoxy-ethylol cyanamide.

3. As a new compound tripropoxy-propylol cyanamide.

4. As a new compound pentahydroxypropoxy-dihydroxypropyl cyanamide.

WALTER P. ERICKS.